United States Patent Office 3,412,959
Patented Nov. 26, 1968

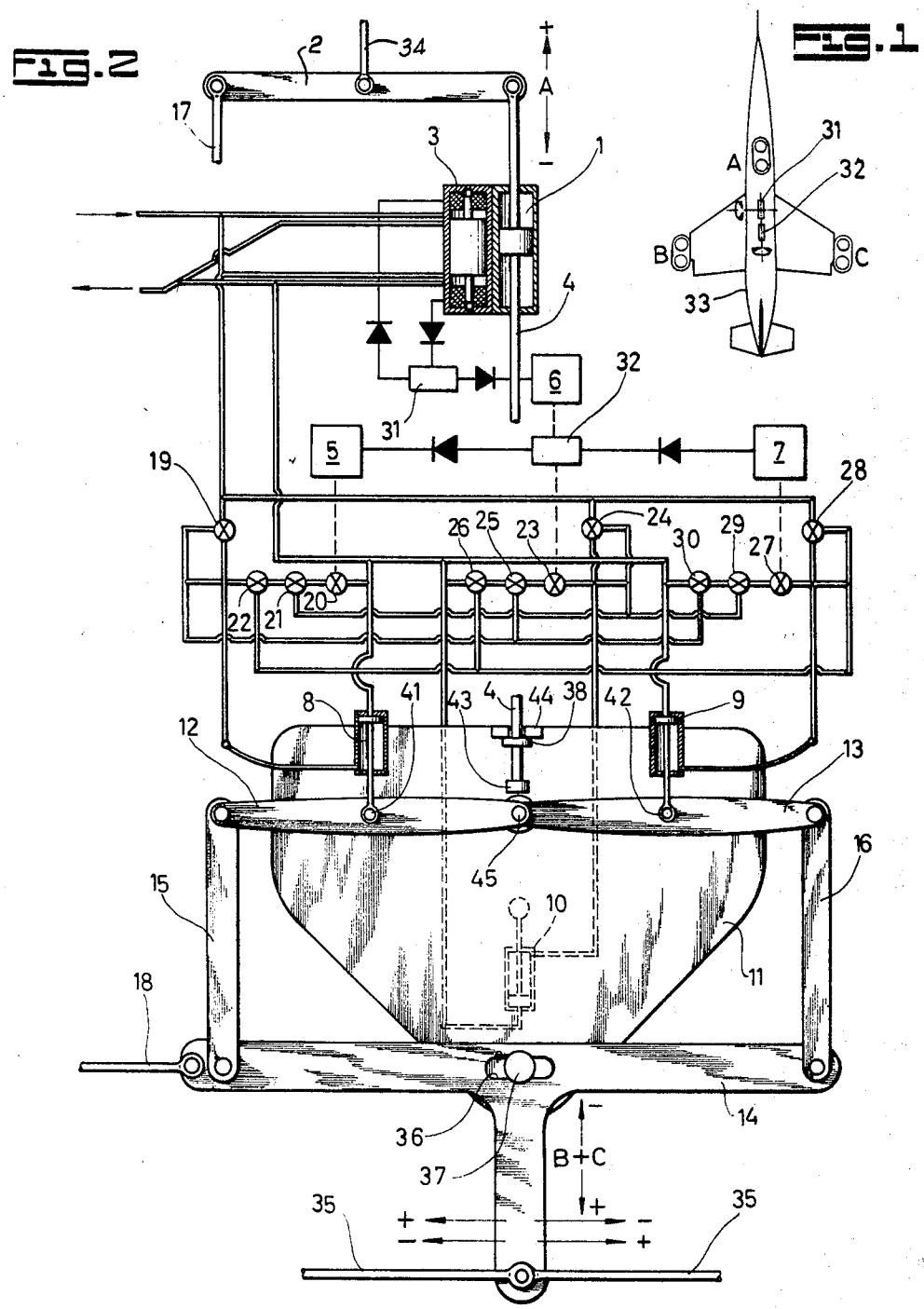

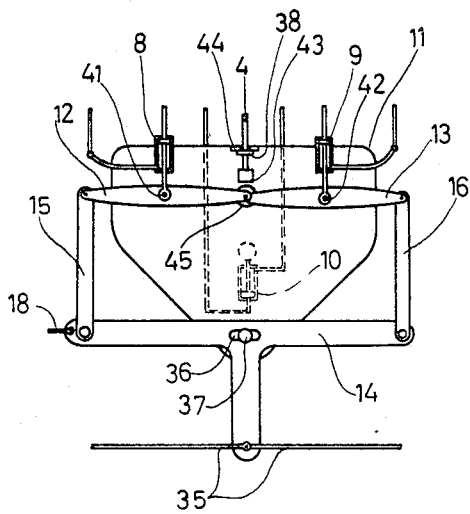
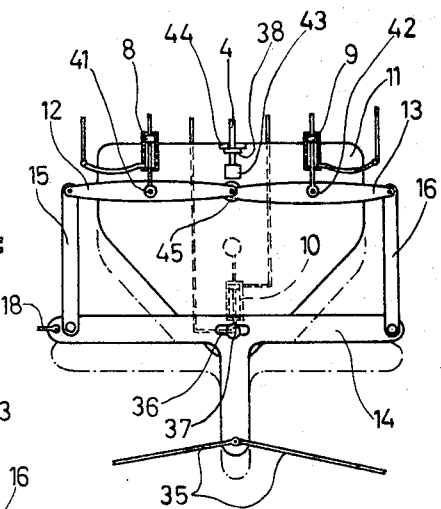
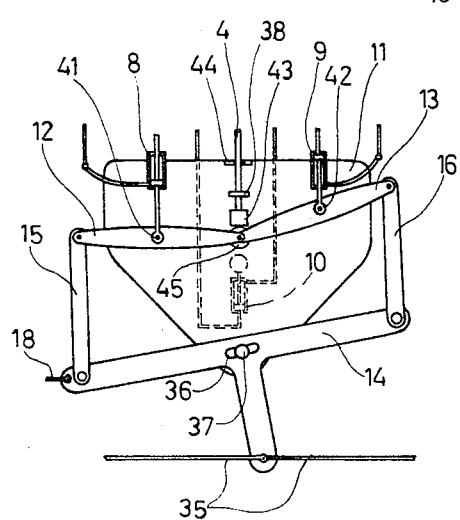

1

3,412,959
ELECTRO-HYDRAULIC TRIMMING APPARATUS FOR JET SUPPORTED VTOL AIRCRAFT
Wolfgang Wachter, Munich, Germany, assignor to Bolkow Gesellschaft mit beschrankter Haftung, Ottobrunn, near Munich, Germany
Filed Mar. 21, 1967, Ser. No. 624,796
Claims priority, application Germany, Mar. 25, 1966, B 86,361
8 Claims. (Cl. 244—52)

ABSTRACT OF THE DISCLOSURE

Electro-hydraulic trimming apparatus for a jet supported VTOL aircraft having plural engines positioned symmetrically to its roll axis, thrust regulators for the engines, a manually operable biaxial control device, and lever means transmitting control movements of the control device to the thrust regulators for compensation of interference moments due to engine failures or unsymmetrical load drops, includes a feeler system converting the interference moments into electrical signals having magnitudes and polarities corresponding to the magnitudes and directions of the interference moments. Angular acceleration meters, one producing control signals responsive to rotation about the roll axis and the other producing control signals responsive to rotation about the pitch axis are connected to respective threshold value switches which transmit, with a preset time delay, control signals exceeding predetermined threshold values. A linearly reciprocable servomotor is connected to the lever means and is operated under the control of an electromagnetically operated four-way valve serving to convert the signals into corresponding compensating movements of the lever means.

Background of the invention

In vertical take-off and landing aircraft, generally known as VTOL aircraft, with lift engines diametrically opposite each other with relation to the center of gravity of the aircraft, it is known how to switch off automatically the lift engine or group of lift engines on one side of the center of gravity upon failure of one or more lift engines on the other side of the center of gravity. Thereby, undesirable tilting movements of the airplane are avoided. For this purpose, the fuel feed device for the engine or group of engines on one side of the center of gravity is driven by the engine or group of engines on the other side of the center of gravity so that, upon failure of an engine on one side of the center of gravity, an engine on the other side of the center of gravity is switched off.

Switch-off devices of this type are, however, suitable only for VTOL aircraft having lift engines arranged in pairs or groups of pairs and which produce equal moments about the roll axis and equal moments about the pitch axis of the aircraft. They therefore present equal thrust and equal lever arms relative to the roll axis and the pitch axis. The failure of one engine of, for example, three engines or engine groups arranged in a triangle symmetrical to the roll axis and symmetrical to the pitch axis of a VTOL aircraft cannot be compensated with the above-mentioned switch off device because of the odd number of engines or engine groups and the different respective lever arms of the engines or engine groups relative to the roll and pitch axes.

In order to avoid dangerous flight attitudes of multi-engine VTOL aircrafts, it is further known how to compensate the considerable rotational or angular accelerations, occurring upon engine failure, by an automatic variation of the regulating range of a flight regulator servomotor. The switching of the initially limited control range

2 of the servomotor of the flight regulator to the enlarged control range, at the instant when external disturbances, such as thrust failure or defective operation of the regulator, can no longer be compensated with the limited control range, is effected by a selectively operable mechanical locking member. This mechanical locking member is selectively engageable and disengageable, and is controlled through electric control signals derived from the engines and supplied, through limiters, to a signal comparing equipment. The mechanical locking member is preferably designed as a clutch claw which is operable by an electric drive between operative and inoperative positions.

With this equipment for control range variation, however, the presence of a flight regulator is functionally essential, and this may give rise to further problems. In particular, if the flight regulator fails, very dangerous flight attitudes may occur because of the relatively long reaction time of the pilot. Additionally, such flight regulators are very expensive and the high reliability required for VTOL aircraft is attainable only by expensive redundance, that is, by multiplication of structural elements or subassemblies.

Another disadvantage is that the increase in the control range of the flight regulator upon occurrence of interference moments in excess of a certain threshold value, together with simultaneous maintenance of all other parameters entering into the control circuit, does not permit optimum design of the flight regulator to be simultaneously effective for normal operation and effective for operation with disturbances.

Summary of the invention

The present invention is directed to control apparatus for VTOL aircraft and, more particularly, to a novel and improved electro-hydraulic trimming apparatus for a jet supported VTOL aircraft and which does not require a flight regulator.

A VTOL aircraft, in the hovering state, is not controllable with aerodynamically acting rudders or control surfaces, and in the transition stage between hovering and cruising, it is controllable only slightly by aerodynamically acting rudders or control surfaces. In accordance with the present invention, a control or trimming apparatus is provided which is able, in the hovering and transition stages or states of a VTOL aircraft, to compensate automatically disturbances exceeding the reaction capacity of a pilot and the magnitude of a normal control of conventional thrust controls.

Thus, the invention comprises an electro-hydraulic trimming apparatus for a jet supported VTOL aircraft having plural engines positioned symmetrically to its roll axis, thrust regulators for the engines, a manually operable biaxial control device, lever means transmitting control movements of the two control device to the thrust regulators for compensation of interference moments due to engine failures or unsymmetrical low drops, a feeler system converting the interference moments into electrical signals having magnitudes and polarities corresponding to the magnitudes and directions of the interference moments, and a novel combination of electrical, electromagnetic and hydraulic control elements. Thus, in accordance with the invention, the feeler system includes, in the vicinity of the center of gravity of the aircraft, two angular acceleration meters producing positive or negative control signals responsive to different directions of rotation about an axis, one meter being responsive to rotation about the roll axis and the other meter being responsive to rotation about the pitch axis. These angular acceleration meters are connected to respective threshold value switches which transmit control signals exceeding predetermined magnitudes, and with a pre-set time delay. The threshold value switches are electrically connected with electromagnetically operated valves connected in a hydraulic circuit and actuating hydraulic locks.

In addition, a hydraulic servomotor is provided which is linearly reciprocable in each of two opposite directions in accordance with the sign of the control signals, and this servomotor is controlled by an electromagnetically operable four-way valve serving as a converter of positive and negative signals into corresponding movements of the servomotor. The servomotor is connected to the above-mentioned lever system. Each of the electromagnetically operated valves is included in series, in a respective bypass of the hydraulic circuit, with two hydraulically operated pressure responsive valves which are so coupled, by control means, either with each other or with hydraulically operated pressure valves connected in the hydraulic supply lines leading to the four-way valve and the servomotor, that at least two of the three hydraulic locks are locked.

In this simple manner, it is possible, without the high cost for a flight regulator which is reliable under all circumstances, to provide trimming apparatus for the compensation of interference moments other than those occurring in normal flight operation, and which functions independently of a flight regulator. The electro hydraulic trimming apparatus of the invention cooperates directly with the lever means which transmits control movements of the pilot's manually operable control device to the thrust regulators of the engines, so that the pilot still perceives approximately the same control feeling at his control device, even under abnormal flight conditions.

It is only when certain limit values of the roll and pitch accelerations, as measured by the acceleration meters, are exceeded, that the trimming apparatus of the invention intervenes automatically and independently of any actuation of the pilot's control device, and for the purpose of restoring a normal flight condition. In addition, the control commands required for normal flight operation can be transmitted through the control device in the same manner as before.

By virtue of the "bypass" arrangement, the hydraulic equipment secures and controls itself. It is thus made certain at all times that, even upon failure of an individual hydraulic valve or an electric signal generator, two contrary compensation commands, for the elimination of interference moments, cannot be carried out.

An object of the invention is to provide novel trimming apparatus for VTOL aircraft having plural engines positioned symmetrically to the roll axis.

Another object of the invention is to provide such a trimming apparatus which is an electro-hydraulic trimming apparatus and is operable to control the thrust regulators for the engines.

A further object of the invention is to provide such an electro-hydraulic trimming apparatus for a jet supported VTOL aircraft, and which is automatically operable on the lever means transmitting control movements of the pilot's manually operable control device to the thrust regulators, and which is operable to compensate interference moments due to engine failures or unsymmetrical load drops.

Still another object of the invention is to provide such a trimming apparatus which is simple and inexpensive in construction and operation and which does not require a flight regulator.

A further object of the invention is to provide such an electro-hydraulic trimming apparatus for a jet supported VTOL aircraft which is operable independently of any flight regulator.

Yet another object of the invention is to provide such a trimming apparatus in which the hydraulic equipment secures and controls itself to assure that, at all times and even upon failure of an individual component of the hydraulic circuit or of an electrical signal generator, two contrary compensation commands for eliminating interference moments cannot be carried out.

A further object of the invention is to provide such an electro-hydraulic trimming apparatus for a jet supported VTOL aircraft in which the pilot still perceives approximately the same control feeling at his control even under abnormal flight conditions.

An ancillary object of the invention is to provide such a trimming apparatus in which commands required for normal flight operation can be given by the pilot's manual control in the same manner as hitherto.

Brief description of the drawings

For an understanding of the principles of the invention, reference is made to the following description of a typical embodiment thereof as shown in the accompanying drawings.

In the drawings:

FIG. 1 is a plan view illustrating schematically the arrangement of three twin engines of a VTOL aircraft;

FIG. 2 is a schematic representation of the invention trimming apparatus as applied to an aircraft having a symmetrical triangular arrangement of its engines; and FIGS. 3, 4 and 5 are schematic representations of different positions of the lever means, in the position of rest and at different interference moments.

Description of the preferred embodiment

In FIG 1, a jet propelled aircraft of the VTOL type is illustrated at 33 as having twin engines B and C accommodated at the ends of the wings symmetrically to the roll axis. Forwardly of the pitch axis, there is a twin engine A whose thrust output and lever arm relative to the pitch axis provide a lift moment equal to the lift moment of the wing engines B and C. In the vicinity of the center of gravity of the aircraft 33, there are located an acceleration meter 31 for the pickup of accelerations of the aircraft about the pitch axis, and an acceleration meter 32, for the pickup of accelerations of the aircraft about the roll axis. The signals furnished by the acceleration meters 31 and 32 are termed "positive" when aircraft 33 undergoes, viewed in the flight direction or from the control board, a roll moment or a pitch moment in a clockwise direction.

FIG. 2 illustrates, somewhat schematically, one embodiment of the electro-hydraulic trimming apparatus of the invention. Referring to FIG. 2, a hydraulic servomotor 1 is illustrated as having a piston rod 4 which is linearly reciprocable in either one of two opposite directions. The upper end of piston rod 4, as viewed in FIG. 2, is connected to the right end of a differential lever 2 which is connected, at substantially its midpoint, to an actuating lever 34 for thrust regulation of the engine group A. The other end of lever 2 is connected to a rod or link 17 leading to the pilot's manually operable control device.

The magnitude and direction of movement of piston rod 4 are under the control of an electromagnetically operated four-way valve 3 actuated by electrical signals from acceleration meter 31 and in accordance with the relative polarity of the signals. Acceleration meter 31 is connected electrically with a threshold value switch 6 which transmits signals to a magnetically operable hydraulic valve 23 only when pitch accelerations of the aircraft exceed a preselected value.

Acceleration meter 32, which is responsive to accelerations about the roll axis of aircraft 33, is connected with threshold switches 5 and 7 which likewise transmit electric signals to respective associated electromagnetically operated hydraulic valves 20 and 27 only when the roll acceleration or moment exceeds a predetermined value.

The mechanical-hydraulic part of the trimming apparatus essentially comprises a lever chain formed by rocking levers 12 and 13, links 15 and 16, and a three-arm lever 14, having the ends of its longer arm pivotally connected to the links 15 and 16. The end of the shorter arm of lever 14 is pivotally connected to actuating levers 35 connected to the thrust regulators of the engines B and C. The left end of the longer arm on lever 14 is also pivotally connected to a rod or bar 18 which serves to transmit roll commands from the pilot's control device.

Levers 12 and 13 are displacable upwardly or downwardly, as viewed in FIG. 2, with such a displacement being permitted only as a function of respective hydraulic locks 8 and 9. A plate 11 is connected to aircraft 33 through an additional hydraulic lock 10, so that a displacement of plate 11 relative to the aircraft cell can be effected only upon release of lock 10. As hydraulic locks 8 and 9 are fixedly connected to movable plate 11, hydraulic fluid is supplied to these locks through flexible hydraulic lines.

Each hydraulic lock 8, 9 and 10, besides being connected to hydraulic supply lines, and mechanically to levers 12 and 13 and plate 11, is connected to a respective bypass system. Thus, each lock 8, 9 and 10 has associated with it, in addition to the electromagnetically operable hydraulic valves, three pressure actuated hydraulic valves. Thus, lock 8 has associated therewith the pressure operated hydraulic valves 19, 21, and 22, lock 9 has associated therewith the pressure operated valves 28, 29 and 30, and lock 10 has associated therewith the pressure operated valves 24, 25 and 26. It will be noted that valves 19, 24 and 28 are interconnected to the hydraulic fluid supply line leading to the four-way valve 3.

The operation of the electro-hydraulic trimming apparatus will now be described. A reduction in the thrust of twin engine A manifests itself by a positive pitch signal in acceleration meter 31. Through this positive pitch signal, valve 3 is operated in such a direction that servomotor 1 operates to move piston rod 4 upwardly. The upward movement of piston rod 4, through lever 2 and actuating lever 34, controls the thrust regulation of engine group A so that an augmentation of the thrust occurs.

At the same time, by virtue of the presence of the positive pitch signal and through the threshold value switch 6, electromagnetically operated valve 23 is opened. As a result of the opening of valve 33, hydraulic lock 10 is short circuited through the pressure operated valves 25 and 26, which have been opened responsive to actuation of valve 24 and the now opened electromagnetically operated valve 23. Lock 10 is thereby unlocked. Simultaneously, with unlocking of valve 10, the corresponding pressure operated valves associated with hydraulic locks 8 and 9 are so actuated that an unlocking of these locks is not possible.

Responsive to the upward movement of piston rod 4, plate 11, as illustrated in FIG. 4, is pulled upwardly by engagement of tappet 38 with nose 44, this movement being possible due the release of hydraulic lock 10. The movement of plate 11 from the position of rest shown in FIG. 3 in an upward direction controls the actuating levers 35, as illustrated in FIG. 4, to operate the thrust regulation of engines B and C in such a manner that the thrust of these two engines is reduced. The compensation action continues to take place until acceleration meter 31 no longer delivers an output signal to threshold value switch 6. Thereupon, servomotor 1 is halted and a state of equilibrium is established between thrust outputs of engines B and C, behind the pitch axis, and the thrust output of engine A, in front of the pitch axis.

Responsive to a decrease in thrust of engines B or C, a roll signal is triggered through acceleration meter 32. if the output of engine C decreases, acceleration meter 32 picks up a "positive" roll signal and delivers this to threshold value switch 5. At a sufficient magnitude of this positive roll signal, electromagnetically operated valve 20 is opened by switch 5, resulting in release of hydraulic lock 8. Simultaneously, through the bypass systems, hydraulic locks 9 and 10 are again locked against all release commands.

A "negative" pitch signal occurs simultaneously with the "positive" roll signal, due to the fact that the sum of the outputs of engines B and C, behind the pitch axis, has decreased. Consequently, servomotor 1 is energized through four-way valve 3 in such a manner that piston rod 4 is displaced downwardly. When piston rod 4 moves downwardly, as viewed in FIG. 2, its ram 43 abuts the common pivot point 44 of rocking levers 12 and 13 and moves this downwardly, as illustrated in FIG. 5. Rocking lever 12 does not pivot in response to this pressure, as its lock 8 is released. Consequently, lever 12 is displaced downward in a parallel manner, while lever 13 is pivoted about pivotal connection 42 by the downward pressure on pivotal connection 45.

Due to the transmission of this movement of rocking levers 12 and 13, through links 15 and 16, to the three-arm lever 14, the latter assumes an oblique attitude, as shown in FIG. 5. Thus, three-arm lever 14 is angularly displaced counterclockwise about bolt 37 engaged in slot 36. Responsive to this angular displacement of lever 14, actuating levers 35 are displaced in such a direction that the thrust of engine C is increased and the thrust of engine B is decreased. Simultaneously, and due to the downward movement of piston rod 4 of servomotor 1, operating on lever 34, the thrust of engine A is likewise reduced.

With a reduction in the thrust of engine B and a corresponding "negative" roll signal through acceleration meter 32, an analogous compensation process is initiated by the electro-hydraulic trimming apparatus. However, in this case lock 9 is released and thus three-arm lever 14 is angularly displaced in a clockwise direction. This results in an increase in the thrust of engine B and a decrease in the thrust of engine C.

A purely negative pitch movement beyond a certain magnitude cannot be compensated by the trimming apparatus. Such a negative pitch movement would mean that both engine groups B and C have thrust reductions symmetrical to the roll axis. However, this can occur, as a practical matter, only at simultaneous total failure of the engine groups B and C. Responsive to any other disturbance of the engine groups B and C, a positive or negative roll signal will always occur simultaneously with a pitch signal, as there is then no thrust reduction which is symmetrical to the roll axis. At a total failure of engine groups B and C, an automatic moment compensation is superfluous as, in vertical climbing flight, the aircraft becomes immediately incapable of flight.

While a specific embodiment of the invention has been shown and described in detail in order to illustrate the application of the principles of the invention, it will be understood that the invention may be embodied otherwise without departing from such principles.

What is claimed is:

1. Electro-hydraulic trimming apparatus for a jet supported VTOL aircraft having plural engines positioned symmetrically to its roll axis, thrust regulators for the engines, a manually operable biaxial control device, lever means transmitting control movements of the control device to the thrust regulators for compensation of interference movements due to engine failures or unsymmetrical load decreases, and a feeler system converting the interference moments into electrical signals having magnitudes and polarities corresponding to the magnitudes and directions of the interference moments, said apparatus comprising, in combination, a linearly reciprocable servomotor connected to said lever means and operable in either one of two opposed directions to correspondingly adjust said thrust regulators; a source of hydraulic fluid under pressure; an electromagnetically operated four-way valve controlling supply of fluid to said servomotor for operation in a selected direction; first and second angular acceleration meters positioned in the vicinity of the center of gravity of said aircraft, said first meter providing positive output signals responsive to pitch moments in one direction and negative output signals responsive to pitch moments in the opposite direction; said second meter providing positive output signals responsive to roll moments in one direction and negative output signals responsive to roll moments in the opposite direction; said first meter being electrically connected to said four-way valve to actuate the same to control said servomotor to operate in a selected direction; a first electromagnetically opened valve in a hydraulic circuit connected to said source; electrical means interconnecting said first meter and said first electromagnetically opened valve for opening of the latter responsive to a positive output signal, above a predetermined value, from said first meter; second and third electromagnetically opened valves in said hydraulic circuit electrically connected to said second meter for opening of said second electromagnetically operated valve responsive to a positive signal, above a predetermined value from said second meter, and opening of said third electromagnetically opened valve responsive to a negative signal, above a predetermined value from said second meter; first, second and third hydraulic locks in said hydraulic circuit operatively associated, respectively, with said first, second and third electromagnetically opened valves, and each connected to a respective movable element of said lever means; a respective normally closed bypass circuit for each lock including, in series, the associated electromagnetically openable valve and a respective pair of pressure operated valves, each bypass circuit releasing its associated lock upon opening of its associated electromagnetically opened valve; and means interconnecting the pressure operated valves of each bypass circuit to the corresponding pressure operated valves of the other two bypass circuits and operable, responsive to opening of an electromagnetically opened valve in one bypass circuit, to close the pressure operated valves in the other two bypass circuits to maintain the locks associated with the latter in a locked condition; said first meter, responsive to a pitch moment in either direction, actuating said four-way valve to control said servomotor to adjust, through said lever means, said thrust regulators in a direction to adjust the engine thrusts on opposite sides of the pitch axis to compensate said pitch moment; said first meter, responsive to a pitch moment, above such preselected magnitude, in one selected direction, opening said first electromagnetically opened valve to release the associated hydraulic lock; said second meter, responsive to a roll movement, above a preselected magnitude, in one direction, opening said second electromagnetically opened valve to release the associated hydraulic lock and, responsive to a roll moment, above said preselected magnitude, in the opposite direction, to open said third electromagnetically opened valve to release the associated hydraulic lock; said first meter, responsive to the resulting differential in the engine thrust on opposite sides of the pitch axis effecting, through said four-way valve, operation of said servomotor in a direction to adjust said thrust regulators to compensate the thrust difference.

2. Electro-hydraulic trimming apparatus for a jet supported VTOL aircraft, as claimed in claim 1, in which the electrical means connecting said first meter to said first electromagnetically opened valve and said second meter to said second and third magnetically opened valves comprises a respective threshold value switch in advance of each electromagnetically opened valve.

3. Electro-hydraulic trimming apparatus for a jet supported VTOL aircraft, as claimed in claim 2, including a linearly displaceable plate forming part of said lever means; said first hydraulic lock being connected between said plate and a fixed portion of said aircraft; each of said second and third hydraulic locks being connected between said plate and the midpoint of a respective first lever; the inner ends of said first levers being pivotally interconnected at a connection aligned with the direction of movement of said servomotor; the outer ends of said first levers being articulated to the thrust regulators of engines on opposite sides of the roll axis of said aircraft.

4. Electro-hydraulic trimming apparatus for a jet supported VTOL aircraft, as claimed in claim 3, in which said servomotor includes a cyinder having a piston displaceable therein, and a piston rod connected to said lever placeable therein, and a piston rod connected to said piston; one end of said piston rod being connected to said lever means and the other end of said piston rod carrying first and second abutments spaced longitudinally thereof; a third abutment on said plate engageable by said first abutment upon movement of said piston rod in a direction to increase the engine thrust forwardly of the pitch axis; said second abutmeent engaging said connection of said first levers upon movement of said piston rod in the opposite direction.

5. Electro-hydraulic trimming apparatus, for a jet supported VTOL aircraft, as claimed in claim 4, in which said lever means includes a three-arm lever pivotally and slidably interconnected, at the intersection of its three arms, to said plate; the first and second arms of said lever being rigid rectilinear extensions of each other, and the third arm extending perpendicularly to said first and second arms; links connecting the outer ends of said first and second arms to the outer ends of respective first levers; the outer end of said third arm being pivotally interconnected to the thrust regulators for the engines on opposite sides of the roll axis of the aircraft; each of said first levers, responsive to release of its associated hydraulic lock, moving parallel with said plate with the other first lever pivoting, to correspondingly pivot said three-arm lever in one or the other direction to effect a decrease in the engine thrust on one side of the roll axis of the aircraft with a corresponding increase in the engine thrust on the other side of the roll axis of the aircraft.

6. Electro-hydraulic trimming apparatus for a jet supported VTOL aircraft, as claimed in claim 5, in which said one end of said piston rod is pivotally connected to one end of a second lever of said lever means, the midpoint of said second lever being pivotally connected to the thrust regulator for the engines located forwardly of the pitch axis; the other end of said second lever being pivotally connected to a rod, forming part of said lever means, and connected to said manually operable control device; the outer end of said first arm of said three-arm lever being pivotally connected to a rod connected to said manually operable control device.

7. Electro-hydraulic trimming apparatus for a jet supported VTOL aircraft, as claimed in claim 3, in which each of said hydraulic locks comprises a piston and a cylinder, with the piston having a piston rod; the cylinders of said second and third hydraulic locks being fixed to said plate.

8. Electro-hydraulic trimming apparatus for a jet supported VTOL aircraft, as claimed in claim 5, in which there are three groups of engines, including a first group positioned forwardly of the pitch axis of the aircraft and second and third groups positioned on respective opposite lateral sides of the roll axis of the air group; the thrust and lever arm of said first group relative to the pitch axis being substantially equal to the thrust and lever arm of said second groups relative to said pitch axis; the thrust regulator of said first group being connected to said second lever, and the thrust regulators of said second and third groups being pivotally interconnected to the outer end of the third arm of said three-arm lever.

References Cited

UNITED STATES PATENTS 3,231,223   1/1966   Upper _____ 244—52

MILTON BUCHLER, *Primary Examiner.*

B. BELKIN, *Assistant Examiner.*